United States Patent
Nagasawa

(10) Patent No.: US 11,700,522 B2
(45) Date of Patent: Jul. 11, 2023

(54) VEHICLE THAT HAS AUTOMATIC NOTIFICATION FUNCTION

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 163 days.

(21) Appl. No.: 17/476,135

(22) Filed: Sep. 15, 2021

(65) Prior Publication Data

US 2022/0103993 A1 Mar. 31, 2022

(30) Foreign Application Priority Data

Sep. 25, 2020 (JP) ................................ 2020-160286

(51) Int. Cl.
*H04W 4/90* (2018.01)
*H04W 4/40* (2018.01)
*H04W 76/50* (2018.01)
*B60R 21/0136* (2006.01)
*B60R 21/0132* (2006.01)

(52) U.S. Cl.
CPC ........... *H04W 4/90* (2018.02); *B60R 21/0132* (2013.01); *B60R 21/0136* (2013.01); *H04W 4/40* (2018.02); *H04W 76/50* (2018.02)

(58) Field of Classification Search
CPC ......... H04W 4/90; H04W 4/40; H04W 76/50; H04W 4/44
See application file for complete search history.

(56) References Cited

U.S. PATENT DOCUMENTS

| 6,957,060 B1 * | 10/2005 | Sharp | .................... H04M 15/39 455/410 |
| 9,248,807 B2 * | 2/2016 | Lee | ......................... G07C 9/20 |
| 2003/0224840 A1 * | 12/2003 | Frank | .................. H04M 1/6091 455/575.9 |

(Continued)

FOREIGN PATENT DOCUMENTS

JP 2001-216588 A 8/2001

*Primary Examiner* — Minjung Kim
(74) *Attorney, Agent, or Firm* — McDermott Will & Emery LLP

(57) ABSTRACT

A vehicle that has an automatic notification function includes a first communication device that transmits emergency information to a server apparatus of an automatic emergency notification system via a base station in a case where an emergency situation arises, a control unit that automatically transmits the emergency information to the server apparatus by using the first communication device when the emergency situation arises, and a second communication device that restrictedly communicates with an external device. The control unit immediately transmits the emergency information to the server apparatus by using the first communication device if the first communication device is capable of immediately transmitting the emergency information, and releases communication restriction on the second communication device to transmit the emergency information to the server apparatus by using the second communication device and the external device if the first communication device is not capable of immediately transmitting the emergency information.

17 Claims, 5 Drawing Sheets

(56) References Cited

U.S. PATENT DOCUMENTS

| | | | |
|---|---|---|---|
| 2014/0096217 A1* | 4/2014 | Lehmann | H04W 12/50 |
| | | | 726/7 |
| 2014/0273955 A1* | 9/2014 | Oesterling | B60R 25/24 |
| | | | 455/411 |
| 2014/0295785 A1* | 10/2014 | Watson | H04W 4/40 |
| | | | 455/433 |
| 2019/0069338 A1* | 2/2019 | Kiss | H04L 61/4511 |
| 2019/0103010 A1* | 4/2019 | Seto | H04M 11/04 |
| 2021/0222660 A1* | 7/2021 | Gil Vera | B60R 25/045 |
| 2021/0409928 A1* | 12/2021 | Mehta | H04W 12/068 |
| 2022/0060895 A1* | 2/2022 | Nishiyama | G07C 9/00174 |

\* cited by examiner

VEHICLE THAT HAS AUTOMATIC NOTIFICATION FUNCTION

CROSS-REFERENCE TO RELATED APPLICATIONS

The present application claims priority from Japanese Patent Application No. 2020-160286 filed on Sep. 25, 2020, the entire contents of which are hereby incorporated by reference.

BACKGROUND

The disclosure relates to a vehicle that has an automatic notification function.

In the case where an emergency situation such as an accident arises, it is thought that a vehicle such as an automobile gives an emergency notification (Japanese Unexamined Patent Application Publication (JP-A) No. 2001-216588). For example, an automatic emergency notification system is actually used in an automobile. The automatic emergency notification system of an automobile that has an accident immediately transmits information in the accident such as the operating state of an occupant protection device in the accident, position, the direction in which an impact is taken in the accident, and the intensity of the impact to a server apparatus in a call center by using an automatic notification device that is disposed in the automobile. In the call center, the information in the accident that is received by the server apparatus is checked, and a medical helicopter or a first aid squad is requested to be dispatched. This enables emergency dispatch based on the information in the accident, and consequently, there is an increased possibility that a person who has the accident is saved.

SUMMARY

An aspect of the disclosure provides a vehicle that has an automatic notification function. The vehicle includes a first communication device, a control unit, and a second communication device. The first communication device is disposed in the vehicle for communication with a base station. The first communication device is configured to transmit emergency information to a server apparatus of an automatic emergency notification system for the vehicle via the base station in a case where an emergency situation arises. The control unit is configured to automatically transmit the emergency information to the server apparatus by using the first communication device in the case where the emergency situation arises. The second communication device differs from the first communication device. The second communication device is disposed in the vehicle for communication with an external device that differs from the base station. The second communication device is configured to restrictedly communicate with the external device. The control unit is configured to determine whether the first communication device is capable of immediately transmitting the emergency information to the server apparatus in the case where the emergency situation arises. Based on determining that the first communication device is capable of immediately transmitting the emergency information, the control unit is configured to immediately transmit the emergency information to the server apparatus by using the first communication device. Based on determining that the first communication device is not capable of immediately transmitting the emergency information, the control unit is configured to release communication restriction on the second communication device to transmit the emergency information to the server apparatus by using the second communication device and the external device.

An aspect of the disclosure provides a vehicle that has an automatic notification function. The vehicle includes a first communication device, a second communication device, and circuitry. The first communication device is disposed in the vehicle for communication with a base station. The first communication device is configured to transmit emergency information to a server apparatus of an automatic emergency notification system for the vehicle via the base station in a case where an emergency situation arises. The second communication device differs from the first communication device. The second communication device is disposed in the vehicle for communication with an external device that differs from the base station. The second communication device is configured to restrictedly communicate with the external device. The circuitry is configured to automatically transmit the emergency information to the server apparatus by using the first communication device in the case where the emergency situation arises. The circuitry is configured to determine whether the first communication device is capable of immediately transmitting the emergency information to the server apparatus in the case where the emergency situation arises. Based on determining that the first communication device is capable of immediately transmitting the emergency information, the circuitry is configured to immediately transmit the emergency information to the server apparatus by using the first communication device. Based on determining that the first communication device is not capable of immediately transmitting the emergency information, the circuitry is configured to release communication restriction on the second communication device to transmit the emergency information to the server apparatus by using the second communication device and the external device.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

There is a possibility that a vehicle that is under an emergency situation such as an accident cannot appropriately give an emergency notification right after that. For example, there is a possibility that a communication device that is disposed in the vehicle for an automatic emergency notification system malfunctions or stops due to the accident. In this case, there is a possibility that the vehicle that is under the emergency situation such as an accident cannot appropriately give the emergency notification.

In some cases where the state of communication is thus not sufficient for transmitting information in an emergency, the vehicle that is in an emergency state immediately transmits the emergency notification to a server apparatus even by using an alternative method to the communication method of the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
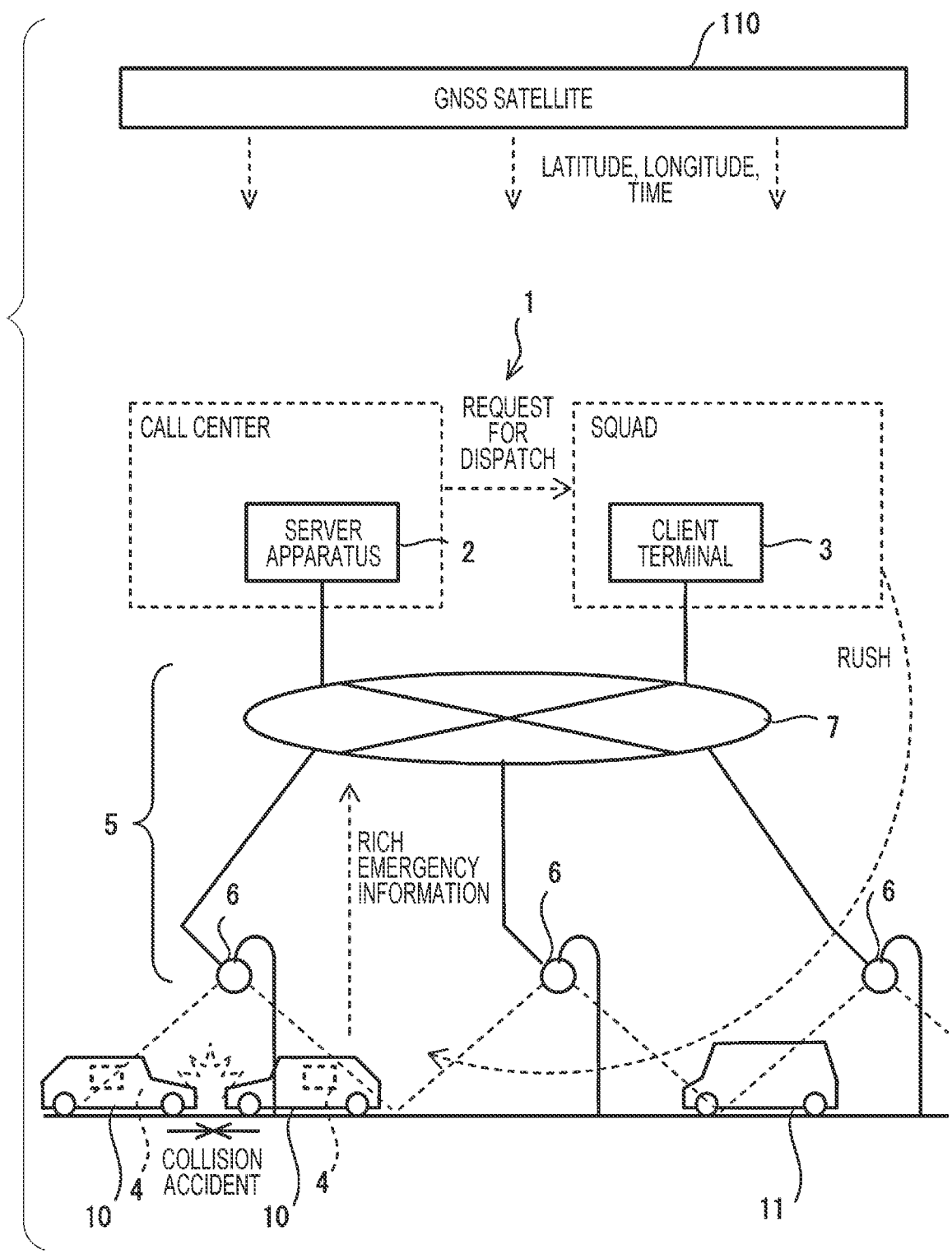
FIG. 1 illustrates an example of an automatic emergency notification system according to an embodiment of the disclosure.

FIG. 1 illustrates an example of an automatic emergency notification system 1 according to the embodiment of the disclosure.

The automatic emergency notification system 1 in FIG. 1 includes a server apparatus 2 that is used in a call center of an institution that manages road accidents of, for example, automobiles 10, a client terminal 3 that is used by a life-saving squad such as a fire department, automatic notification devices 4 that are disposed in the automobiles 10, and a wireless communication network 5 for providing a communication line to these. The wireless communication network 5 includes base stations 6 for communication with wireless terminals such as the automatic notification devices 4, for example, base stations that are disposed along a road and that disperse in areas, and a communication network 7 via which the base stations 6 are coupled to each other. The base stations 6 are disposed, for example, along a highway and function as access points to which the wireless terminals that can communicate with each other in a zone are coupled. As illustrated in FIG. 1, the server apparatus 2 in the call center and the client terminal 3 of the life-saving squad are coupled to the communication network 7.

As for the automatic emergency notification system 1, when an accident occurs, each automobile 10 that has the accident automatically and immediately transmits information in the accident for notification that an emergency situation arises to the server apparatus 2 in the call center, based on detection thereof. The information in the accident for notification that the emergency situation arises includes the operating state of an occupant protection device 80 in the accident, the location of the accident, the direction in which an impact is taken in the accident, and the intensity of the impact. The automobile 10 has an automatic notification function. In the call center, a request for dispatch is made based on the information in the accident that is received by the server apparatus 2. The call center can select the life-saving squad depending on the state of the accident and request the life-saving squad to be dispatched. The request for dispatch is transmitted from the server apparatus 2 to the client terminal 3 of the life-saving squad. The life-saving squad dispatches an ambulance 11 or a medical helicopter, based on the received request for dispatch. The ambulance 11 or the medical helicopter can be dispatched to the site of the accident with the state of the accident grasped such that the state of the accident is dealt with. The ambulance 11 or the medical helicopter that is dispatched for first aid can provide an appropriate life-saving treatment to a person who has the accident in short lead time.

The automatic emergency notification system 1 illustrated by way of example in FIG. 1 is used by organizations in collaboration with each other. However, the automatic emergency notification system 1 may be used by a single manager of areas including roads on which each automobile 10, for example, can pass such as police, a fire department, a public office, a hospital, a medical institution, a security company, or a management company.

FIG. 1 also illustrates GNSS satellites 110. The apparatus and the devices in FIG. 1 can acquire the position thereof and time by receiving radio waves including position information about the latitude and longitude and time information from the GNSS satellites 110. The apparatus and the devices receive radio waves from the GNSS satellites 110 in cooperation with each other and can consequently match the current time and so on with high precision. For time at which the accident occurs, the common time can be used.

Incidentally, there is a possibility that the automobile 10 that is under the emergency situation such as an accident cannot appropriately give the emergency notification right after that. For example, there is a possibility that a communication device that is disposed in the automobile 10 for the automatic emergency notification system 1 malfunctions or stops due to the accident. In this case, there is a possibility that the automobile 10 that is under the emergency situation such as an accident cannot appropriately give the emergency notification.

In some cases where the state of communication is thus not sufficient for transmitting information in an emergency, the automobile 10 that is in an emergency state immediately transmits the emergency notification to the server apparatus 2 even by using an alternative method to the communication method of the automobile.

The information in the accident for notification that the emergency situation arises as described above is useful to determine status. However, there is a possibility that it cannot be said that the information is sufficient to determine the status. Depending on the state of the accident, there is a possibility that emergency action cannot be sufficiently taken at the site even if the request for emergency dispatch is made based on the information in the accident for notification that the emergency situation arises. For example, in the case where another special situation arises such as the case where a secondary collision occurs, there is a possibility that the information in the accident for notification that the emergency situation arises is insufficient to grasp the status. For this reason, it is considered that another information useful to determine the status of the accident can be immediately transmitted when the emergency situation arises in addition to the information in the accident for notification that the emergency situation arises or instead of the information in the accident. An example of such information is image data that is acquired by imaging the interior or exterior of the automobile after the accident occurs. As a result of an image being acquired, the degree of injury of an occupant, for example, which is difficult to grasp by using the information in the accident for notification that the emergency situation arises alone, can be grasped in detail in the call center.

However, there are various hindrances to immediately transmitting rich emergency information, for example, such image data from the automobile 10 that has the accident to the server apparatus 2. For example, even when the automobile 10 presumably has no problem, there is a possibility that the base station 6 with which the automobile 10 can communicate is old and has low performance, which corresponds to environment unsuitable to immediately transmit the rich emergency information. In this case, it is difficult for the automobile 10 to immediately transmit the rich emergency information that has a large information amount such as image data to the base station 6.

In the case where the emergency situation such as an accident arises, the automobile 10 thus tries to immediately transmit rich information that has a possibility of not being transmitted as the information in the accident for notification that the emergency situation arises to the server apparatus 2 regardless of the state when the emergency situation arises.

Figure 2:
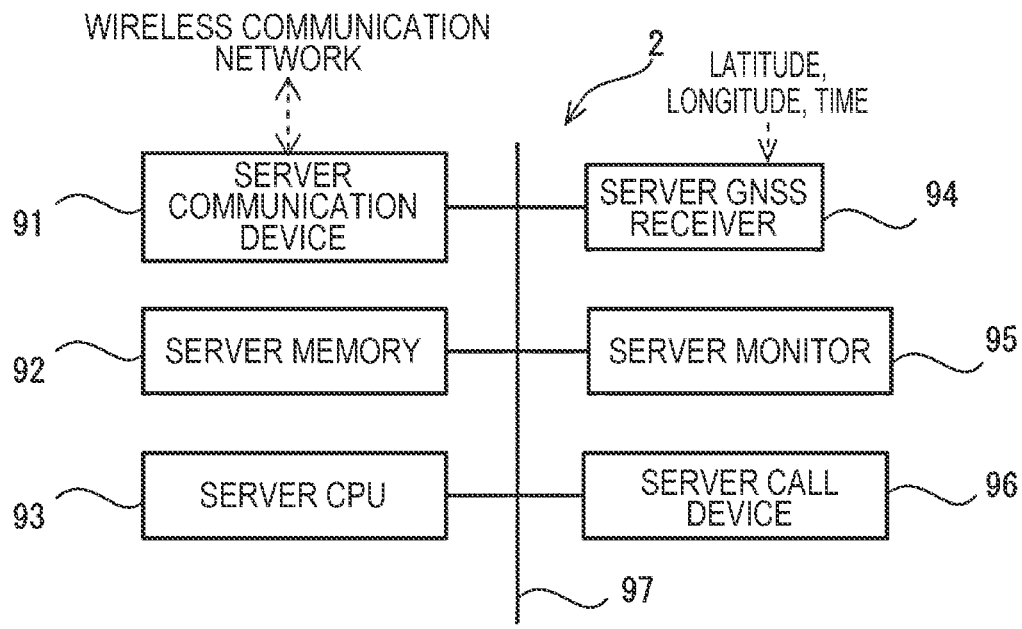
FIG. 2 illustrates a server apparatus in a call center that receives an emergency notification in FIG. 1.

FIG. 2 illustrates the server apparatus 2 in the call center that receives the emergency notification in FIG. 1.

The server apparatus 2 in FIG. 2 includes a server communication device 91, a server memory 92, a server CPU 93, a server GNSS receiver 94, a server monitor 95, a server call device 96, and a server bus 97 to which these are coupled.

The server communication device 91 is coupled to the communication network 7 of the wireless communication network 5. The server communication device 91 can transmit and receive data to and from another device such as an external communication terminal 60 that is a wireless terminal that is disposed in the automobile 10 or the client terminal 3 via the wireless communication network 5.

The server GNSS receiver 94 receives the radio waves of the GNSS satellites 110 and acquires the current time. The server apparatus 2 may include a server timer that is modified by using the current time of the server GNSS receiver 94 and that is not illustrated.

The server monitor 95 displays information in the server apparatus 2. For example, the server monitor 95 displays the emergency information that is received by the server apparatus 2 from the automobile 10 that has, for example, the accident.

The server call device 96 establishes a call line with the external communication terminal 60 or a mobile terminal 121 by using the server communication device 91. An operator in the call center can call a user of the external communication terminal 60 or a user of the mobile terminal 121 by using the coupled call line.

The server memory 92 is a computer-readable storage medium and stores, for example, a program that is run by the server CPU 93 and settings. The server memory 92 may store information about the content of control implemented by the server CPU 93. The server CPU 93 reads the program in the server memory 92 and runs the program. This achieves a server control unit in the server apparatus 2. The server CPU 93 that serves as the server control unit manages the entire operation of the server apparatus 2.

Figure 3:
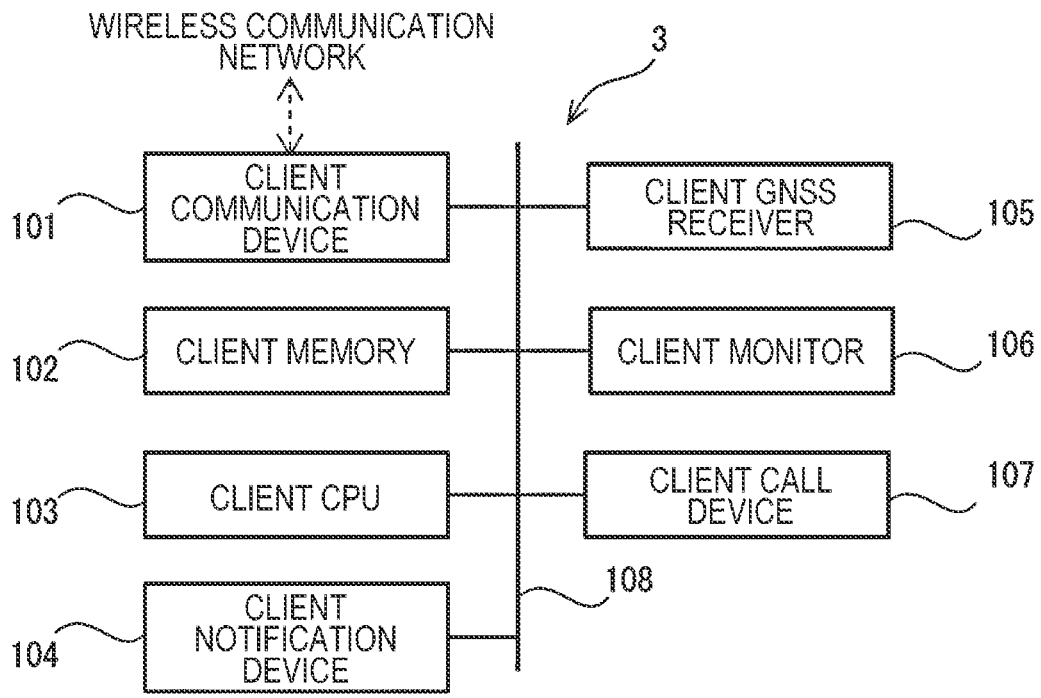
FIG. 3 illustrates a client terminal of a squad, members of which rush in FIG. 1.

FIG. 3 illustrates the client terminal 3 of the squad, members of which rush in FIG. 1.

The client terminal 3 in FIG. 3 includes a client communication device 101, a client memory 102, a client CPU 103, a client notification device 104, a client GNSS receiver 105, a client monitor 106, a client call device 107, and a client bus 108 to which these are coupled.

The client communication device 101 is coupled to the communication network 7 of the wireless communication network 5. The client communication device 101 can transmit and receive data to and from another device such as external communication terminal 60 that is a wireless terminal of the automobile 10 or the server apparatus 2 via the wireless communication network 5.

The client GNSS receiver 105 receives the radio waves of the GNSS satellites 110 and acquires the current time. The client terminal 3 may include a server timer that is modified by using the current time of the client GNSS receiver 105 and that is not illustrated.

The client monitor 106 displays information in the client terminal 3. For example, the client monitor 106 displays the request for dispatch that is received from the server apparatus 2.

The client notification device 104 outputs, for example, a sound for the request for dispatch to the members of the squad. The client call device 107 establishes a call line with the external communication terminal 60 or the mobile terminal 121 by using the client communication device 101. The members of the squad can call the user of the external communication terminal 60 or the user of the mobile terminal 121 by using the coupled call line.

The client memory 102 is a computer-readable storage medium and stores, for example, a program that is run by the client CPU 103 and settings. The client memory 102 may store information about the content of control implemented by the client CPU 103. The client CPU 103 reads the program in the client memory 102 and runs the program. This achieves a client control unit in the client terminal 3. The client CPU 103 that serves as the client control unit manages the entire operation of the client terminal 3.

Figure 4:
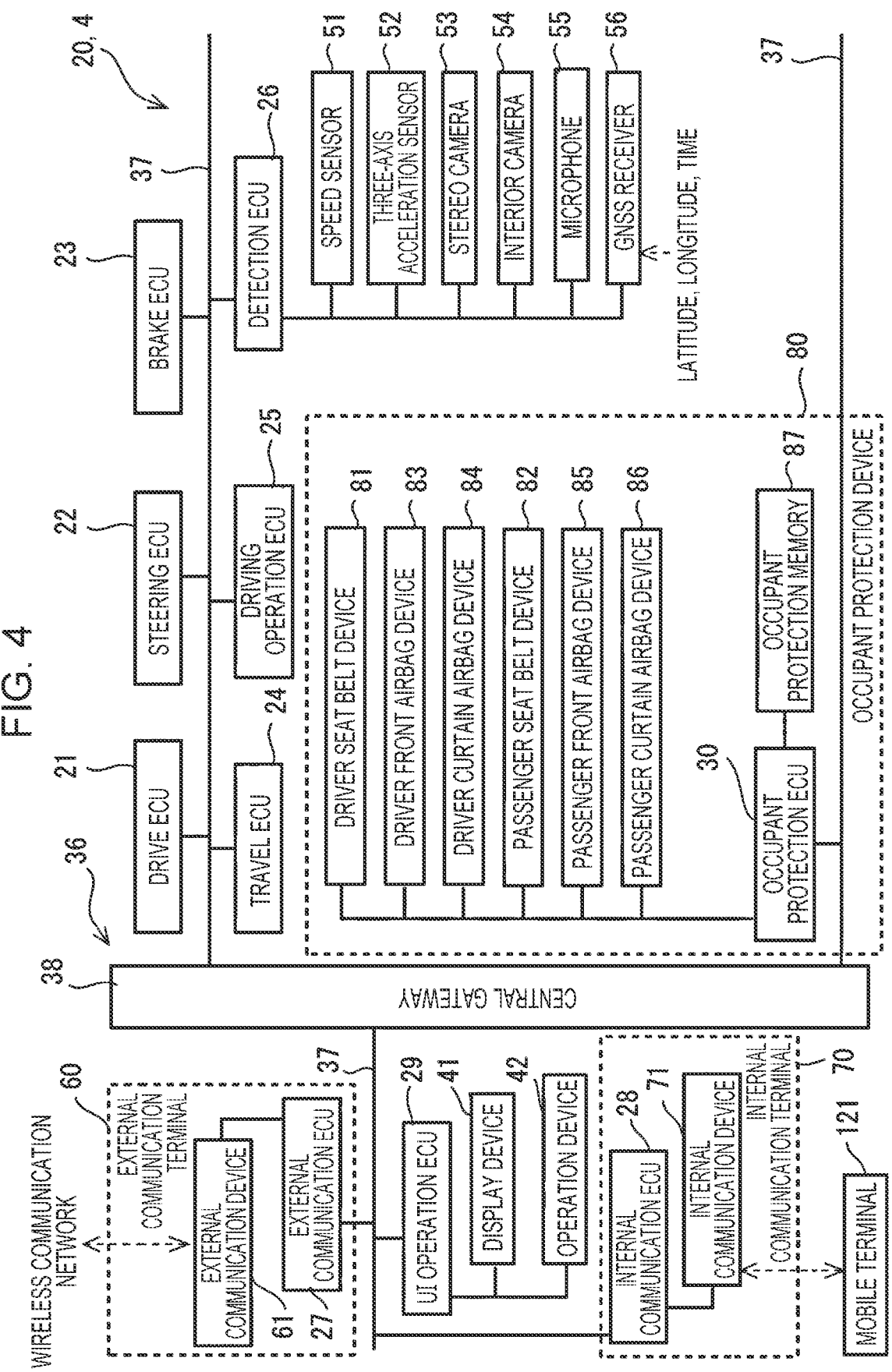
FIG. 4 illustrates a control system that can function as an automatic notification device of an automobile that can be in an emergency state such as an accident in FIG. 1.

FIG. 4 illustrates a control system 20 that can function as the automatic notification device 4 of the automobile 10 that can be in the emergency state such as an accident in FIG. 1.

The control system 20 of the automobile 10 in FIG. 4 is representatively illustrated as electronic control units (ECUs) into which respective control devices are incorporated. The control devices may include, for example, a memory that stores a control program and data, input and output ports that are coupled to an object to be controlled or a state detection device thereof, a timer for measuring a period or time, and an internal bus to which these are coupled in addition to the ECUs.

In one example, the ECUs illustrated in FIG. 4 include a drive ECU 21, a steering ECU 22, a brake ECU 23, a travel ECU 24, a driving operation ECU 25, a detection ECU 26, an external communication ECU 27, an internal communication ECU 28, an UI operation ECU 29, and an occupant protection ECU 30. The control system 20 of the automobile 10 may include another ECU not illustrated.

The ECUs are coupled to an automobile network 36, such as a controller area network (CAN) or a local interconnect network (LIN), that is used in the automobile 10. The automobile network 36 may include bus cables 37 to which the ECUs can be coupled and a central gateway (CGW) 38 that serves as a relay device to which the bus cables 37 are coupled. Different IDs are assigned as identification information to the ECUs. Basically, each of the ECUs periodically outputs data to another ECU. The ID of the ECU that outputs the data and the ID of the other ECU to which the data is outputted are added into the data. The other ECU monitors the bus cable 37. In the case where the ID of the ECU to which the data is outputted is, for example, its own ID, the ECU acquires the data and performs a process based on the data. The central gateway 38 monitors the coupled bus cables 37. When the central gateway detects an ECU that is coupled to the bus cable 37 that differs from the bus cable 37 for the ECU that outputs the data, the central gateway 38 outputs the data to the bus cable 37 to which the detected ECU is coupled. Such a relay process of the central gateway 38 enables each ECU to receive and output the data from and to the other ECUs that are coupled to the bus cables 37 that differ from the bus cable 37 to which the ECU is coupled.

User interface devices for an occupant on board are coupled to the UI operation ECU 29, and examples thereof include a display device 41 and an operation device 42. Examples of the display device 41 may include a liquid-crystal device and an image projection device. Examples of the operation device 42 may include a touch screen, a keyboard, and a non-contact operation detection device. For example, the display device 41 and the operation device 42 may be installed on an inner surface in an automobile cabin in which the occupant gets in. The UI operation ECU 29 acquires data from the automobile network 36 and causes the display device 41 to display the data. The UI operation ECU 29 outputs an operation that is inputted into the operation device 42 to the automobile network 36. The UI operation ECU 29 may perform a process based on the inputted operation and may add the result of the process into the data. For example, the UI operation ECU 29 may cause the display device 41 to display a navigation screen for setting a destination, may search for a path to the destination that is selected by the inputted operation, and may add path data into the data. The path data may contain attribution information about a road that is used for movement from the current position to the destination such as a lane.

A steering wheel, a brake pedal, an accelerator pedal, and a select lever of transmission that serve as operation members for the occupant to control the travelling automobile 10 and that are not illustrated, for example, are coupled to the driving operation ECU 25. When the operation members are operated, the driving operation ECU 25 outputs data containing the presence of an operation and a manipulated variable to the automobile network 36. The driving operation ECU 25 may perform a process related to the operation of each operation member and may add the result of the process into the data. For example, in the case where the accelerator pedal is operated with another moving body or a stationary object existing in the direction in which the automobile 10 travels, the driving operation ECU 25 may determine whether the operation is abnormal and may add the result of determination into the data.

Detection members for detecting the state of the travelling automobile 10 are coupled to the detection ECU 26, and examples thereof include a speed sensor 51 that detects the speed of the automobile 10, a three-axis acceleration sensor 52 that detects the acceleration of the automobile 10, a stereo camera 53 that images surroundings outside the automobile 10, an interior camera 54 that images the occupant in the automobile cabin, a microphone 55 that converts sounds inside and outside the interior into data, and a GNSS receiver 56 that detects the position of the automobile 10. The GNSS receiver 56 receives the radio waves from the GNSS satellites 110 and acquires the current position of the automobile that is represented by the latitude and longitude and the current time. The detection ECU 26 acquires detection information from the detection members and outputs data containing the detection information to the automobile network 36. The detection ECU 26 may perform a process based on the detection information and may add the result of the process into the data. For example, in the case where the three-axis acceleration sensor 52 detects acceleration more than a collision detection threshold, the detection ECU 26 may determine collision detection and may add the result of the collision detection into the data. The detection ECU 26 may extract an object near the automobile such as a pedestrian, another automobile 10, a roadside tree, a utility pole, or a guardrail, based on the image of the stereo camera 53, may determine the kind and attributes of the object, may predict the relative direction and relative distance of the object and a movement direction if the object moves depending on changes in the position or size of the object in the image, may add information about a forecast for a collision with another object including the result of prediction into the data, and may output the data to the automobile network 36.

An external communication device 61 is coupled to the external communication ECU 27. The external communication ECU 27 and the external communication device 61 are included in the external communication terminal 60 that directly communicates with the base station 6 in the automobile 10. The external communication terminal 60 corresponds to a first communication device. The external communication device 61 wirelessly communicates with the base station 6 of the wireless communication network 5 near the automobile 10. The external communication ECU 27 transmits and receives data to and from the server apparatus 2 via the wireless communication network 5 by using wireless communication between the external communication device 61 and the base station 6. These are included in the external communication terminal 60 that is disposed in the automobile 10.

An internal communication device 71 is coupled to the internal communication ECU 28. The internal communication ECU 28 and the internal communication device 71 are included in an internal communication terminal 70 that is disposed in the automobile 10 for near field communication with the mobile terminal 121 in the interior of the automobile 10. The internal communication device 71 authenticates the mobile terminal 121 of an occupant in the interior of the automobile for near field wireless communication with the mobile terminal 121 with restricted output for the communication with the mobile terminal 121. In this case, the internal communication device 71 transmits and receives data to and from the mobile terminal 121 that is registered as an authenticated terminal and that is within a range that enables the communication with the restricted output, but transmits and receives no data to and from another mobile terminal 121. Authentication information about the mobile terminal 121 may be registered in advance in a memory, not illustrated, of the internal communication ECU 28. The internal communication terminal 70 that differs from the external communication terminal 60 is thus disposed as a second communication device in the automobile 10 for the communication with the mobile terminal 121 of the occupant that is an external device that differs from the base station 6 and restrictedly communicates with the external device.

A terminal that can wirelessly communicate directly with the base station 6 of the wireless communication network 5 basically suffices for the mobile terminal 121 of the occupant. The mobile terminal 121 can communicate with the same base station 6 as the external communication terminal 60 of the automobile 10 and can communicate with another base station 6. The mobile terminal 121 can wirelessly communicate with the optimum base station 6 depending on communication environment or performance irrelevantly to and separately from the external communication terminal 60 of the automobile 10.

In an example according to the present embodiment, the mobile terminal 121 is owned by the occupant. However, the mobile terminal 121 may be owned by a person who differs from the occupant such as a pedestrian who is near the site of the accident.

The travel ECU 24 controls the travelling automobile 10. The travel ECU 24 acquires the data from the external communication ECU 27, the detection ECU 26, and the driving operation ECU 25, for example, via the automobile network 36 and controls automatic driving or manual driving assistance for the travelling automobile 10. The travel ECU 24 generates travel control data for controlling the travelling automobile 10, based on the acquired data and outputs the travel control data to the drive ECU 21, the steering ECU 22, and the brake ECU 23. The drive ECU 21, the steering ECU 22, and the brake ECU 23 control the travelling automobile 10, based on the received travel control data.

Seat belt devices, airbag devices, and an occupant protection memory 87 are coupled to the occupant protection ECU 30. Examples of the seat belt devices include a driver seat belt device 81 for an occupant who drives the automobile 10 and a passenger seat belt device 82 for an occupant who gets in the automobile 10 together. Examples of the airbag devices include a driver front airbag device 83 that inflates in front of the occupant who drives the automobile 10, a driver curtain airbag device 84 that inflates on an outer side of the occupant who drives the automobile 10, a passenger front airbag device 85 that inflates in front of the occupant who gets in the automobile 10 together, and a passenger curtain airbag device 86 that inflates on an outer side of the occupant who gets in the automobile 10 together. These are included in the occupant protection device 80.

The occupant protection ECU 30 actuates or controls a seat belt device or an airbag device, based on information about the result of the collision detection or the information about the forecast for a collision with another object from the detection ECU 26.

The occupant protection memory 87 is a computer-readable storage medium and stores, for example, a program that is run by the occupant protection ECU 30 and settings. The occupant protection memory 87 may store information about the content of control implemented by the occupant protection ECU 30. The occupant protection ECU 30 reads the program in the occupant protection memory 87 and runs the program. This enables the occupant protection ECU 30 to function as an occupant protection control unit in the automobile 10.

For example, when the emergency situation such as a collision is detected, the occupant protection ECU 30 implements occupant protection control. Following this, the occupant protection ECU 30 automatically and immediately transmits rich emergency information including image data and the information in the accident collected after the accident occurs to the server apparatus 2 of the automatic emergency notification system 1 by using the external communication terminal 60 that is disposed in the automobile 10 for communication with the base station 6. The rich emergency information may include the information in the accident for notification that the emergency situation arises and information for determining the other status of the accident such as information and image data before the accident occurs. The rich emergency information is transmitted to the server apparatus 2 of the automatic emergency notification system 1 via the external communication terminal 60, the base station 6, and the wireless communication network 5.

Figure 5:
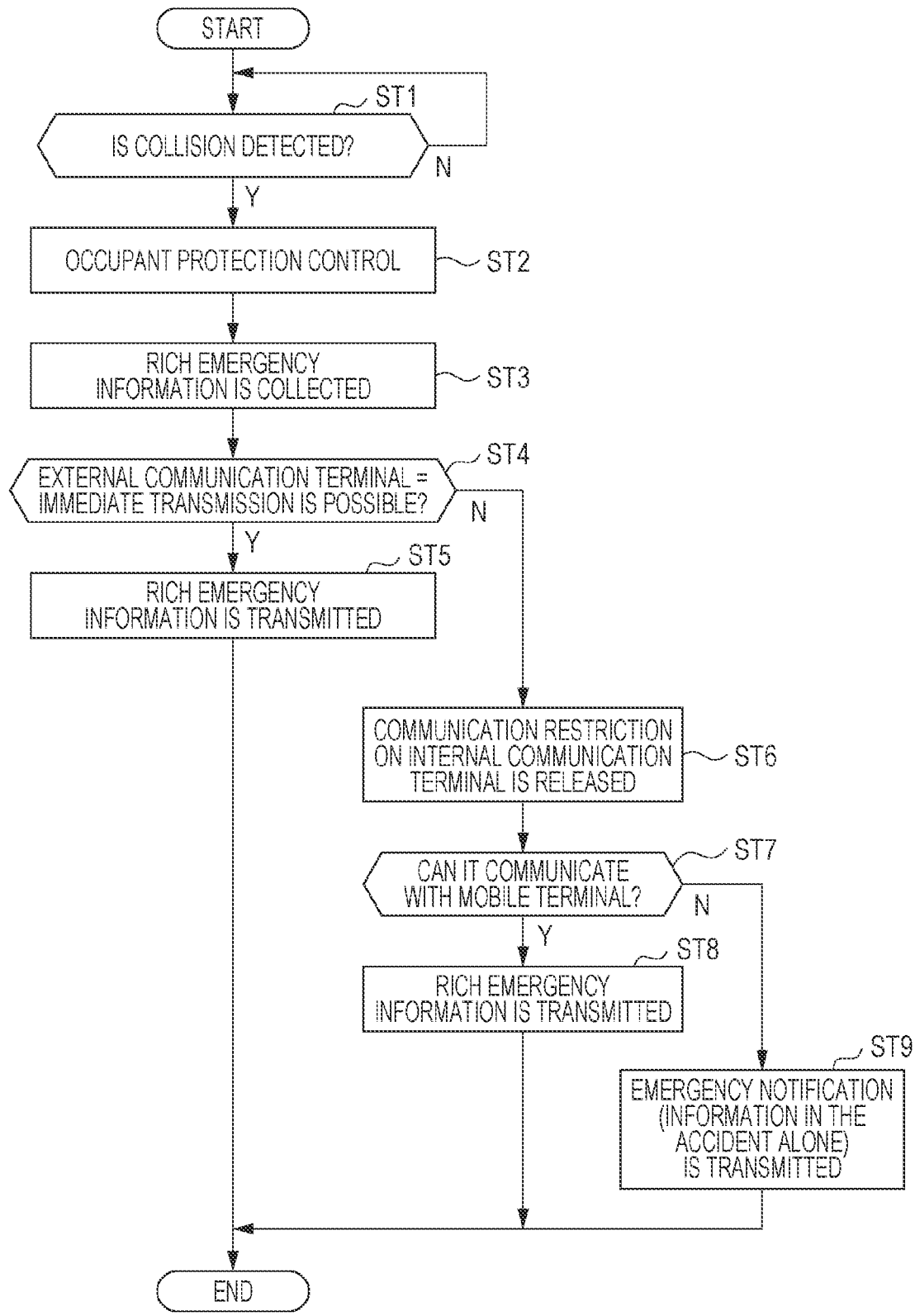
FIG. 5 is a flowchart illustrating an occupant protection process and an automatic notification process that are performed in an automobile that has a collision accident regarding the automatic emergency notification system in FIG. 1.

FIG. 5 is a flowchart illustrating an occupant protection process and an automatic notification process that are performed in the automobile 10 that has a collision accident regarding the automatic emergency notification system 1 in FIG. 1.

The automobile 10 repeatedly performs processing in FIG. 5. When the automobile 10 is under the emergency situation due to the accident, the occupant protection ECU 30 collects the emergency information and automatically transmits the emergency information to the server apparatus 2 by using the external communication terminal 60.

At a step ST1, the detection ECU 26 of the automobile 10 detects a collision. The detection ECU 26 detects the collision, for example, when the magnitude of the acceleration that is detected by the three-axis acceleration sensor 52 is more than a predetermined threshold. While no collision is detected, the detection ECU 26 repeatedly performs this process. When the collision is detected, the detection ECU 26 transmits collision detection information to the occupant protection ECU 30 and proceeds the processing to a step ST2.

The detection ECU 26 may optionally detect the collision in advance by forecasting that there is a possibility that the collision cannot be avoided before the step ST1 or such that this step alternates with the step ST1. The detection ECU 26 may forecast the collision, for example, by determining the presence of another moving body that approaches the automobile, based on the image of the stereo camera 53. During a period from the forecast for the collision to the actual detection of the collision, the occupant protection ECU 30 may implement pre-control for occupant protection, based on information that is acquired by forecasting the collision by the detection ECU 26. The occupant protection ECU 30 may forecast the form of the collision and may select a seat belt device and an airbag device to be actuated. The occupant protection ECU 30 may select a seat belt device of a seat on which an occupant sits and an airbag device that inflates in the direction in which the upper body of the occupant falls down due to the collision. The occupant protection ECU 30 may take up a surplus part of the seat belt of the selected seat belt device to achieve a pre-tension state. The occupant protection ECU 30 may perform another process. For example, the occupant protection ECU 30 may set how the airbag device inflates in the direction in which the upper body of the occupant falls down due to the collision or may cause the airbag device to pre-inflate, based on the weighted gravity direction and degree of the forecasted collision.

At the step ST2, the occupant protection ECU 30 of the automobile 10 that detects the collision performs the occupant protection control, based on information that is acquired by detecting the collision by using the detection ECU 26 at the step ST1. The occupant protection ECU 30 selects and actuates a seat belt device and an airbag device. For example, in the case of a head-on collision, the occupant protection ECU 30 selects and actuates the driver seat belt device 81 and the passenger seat belt device 82 in front of the seats on which the occupants sit. The occupant protection ECU 30 selects and actuates a seat belt device of a seat on which an occupant sits. Consequently, the occupants who sit on the seats are basically restrained on the seats by the seat belts. When the occupants still shift from the seats, the impact is absorbed by the airbags that inflate at positions to which the upper bodies and the heads move. The occupants can be protected from the impact of the collision.

According to the present embodiment, the occupant protection control is implemented at the step ST2 after the collision is detected. However, the occupant protection control may be implemented before the step ST1 when the collision is forecasted during the pre-control.

At a step ST3, the occupant protection ECU 30 of the automobile 10 that detects the collision collects the emergency information that can be used to determine the accident in the call center. The occupant protection ECU 30 collects, from parts of the automobile 10, rich information including image data that is acquired by imaging the interior as a video or a still image after the accident, image data that is acquired by imaging the exterior as a video or a still image after the accident, information about the presence of multiple collisions, information about the kind, color, and characteristics of the automobile, information about an occupant-on-board state before the accident, occupant biometric information after the accident, and information about changes in the state of the automobile 10 before and after the accident in addition to the information in the accident for notification that the emergency situation arises such as information about the intensity and direction of the impact on the automobile 10, information about the operation of the occupant protection device 80, and information about the location and time of the detected collision. Basically, the information is collected after the emergency situation arises due to the accident. Depending on the kind of the information, however, part of the information may be collected when the accident is forecasted right before the accident occurs. For example, the three-axis acceleration sensor 52 detects the intensity and direction of the impact on the automobile 10 due to the accident. The GNSS receiver 56 detects the position and time of the accident. The occupant protection ECU 30 has information about the activated seat belt device and airbag device. Among these, the occupant protection ECU 30 collects the rich emergency information including the information in the accident that is collected after the emergency situation arises and information before the emergency situation arises.

At a step ST4, the occupant protection ECU 30 of the automobile 10 determines whether the external communication terminal 60 that is used for an automatic notification can immediately transmit all of the rich emergency information that is collected before and after the emergency situation arises. There is a possibility that the external communication terminal 60 malfunctions due to, for example, the accident. There is a possibility that the base station 6 cannot communicate due to an aftereffect of the accident. For example, there is a possibility that the external communication terminal 60 cannot establish a communication channel with the base station 6. Even when the external communication terminal 60 can communicate with the base station 6, there is a possibility that all of the rich emergency information cannot be immediately transmitted because the communication capability of the communication channel that is established with the base station 6 is lacking, or the communication performance of the base station 6 that can communicate is not sufficient. The occupant protection ECU 30 comprehensively determines the status of these. If the status of at least one of these is recognized, the occupant protection ECU 30 determines that immediate transmission is impossible and proceeds the processing to a step ST6. If the status of any of these is not recognized, the occupant protection ECU 30 proceeds the processing to a step ST5. The occupant protection ECU 30 thus determines whether the external communication terminal 60 can immediately transmit the rich emergency information to the server apparatus 2 via the base station 6 that can communicate at the time when the emergency situation such as an accident arises.

The external communication ECU 27 may determine whether the external communication terminal 60 can transmit the rich emergency information.

At the step ST5, the external communication ECU 27 of the external communication terminal 60 of the automobile 10 transmits the rich emergency information that is collected before and after the emergency situation arises to the server apparatus 2 by using the external communication device 61. The rich emergency information is immediately transmitted from the external communication terminal 60 to the server apparatus 2 for the request for the emergency dispatch via the base station 6 that can communicate at the time. The automobile 10 can immediately transmit the rich emergency information to the server apparatus 2, based on the detection of the accident of the automobile 10.

The step ST6 is performed in the case where there is a possibility that the external communication terminal 60 cannot immediately transmit the rich emergency information to the server apparatus 2 via the base station 6 that can communicate at the time when the emergency situation such as an accident arises. In this case, the occupant protection ECU 30 of the automobile 10 creates a state in which the rich emergency information can be immediately transmitted by using another communication device that differs from the external communication terminal 60 and that is disposed in the automobile 10, here the internal communication terminal 70. Here, the occupant protection ECU 30 of the automobile 10 releases communication restriction on the internal communication terminal 70. The internal communication ECU 28 of the internal communication terminal 70 typically authenticates the mobile terminal 121 of the occupant in the interior of the automobile 10 and communicates with the mobile terminal 121 by the near field wireless communication with the restricted output for the communication with the mobile terminal 121. In this case, the occupant protection ECU 30 of the automobile 10 releases access restriction with authentication and communication range restriction with inhibited communication output on the internal communication ECU 28. The occupant protection ECU 30 makes the internal communication ECU 28 able to communicate with any mobile terminal 121 with the maximum output without authentication. In this case, the internal communication ECU 28 of the internal communication terminal 70 can communicate with, for example, an exterior mobile terminal 121 that is not authenticated. The internal communication ECU 28 can communicate with the exterior mobile terminal 121 near the automobile without performing an authentication process. The mobile terminal 121 may be owned by a pedestrian who is near the site of the accident.

At a step ST7, the occupant protection ECU 30 of the automobile 10 determines whether the internal communication terminal 70 can communicate with the mobile terminal 121 that serves as the external device. If the internal communication terminal 70 can communicate with the mobile terminal 121, the internal communication ECU 28 checks whether the mobile terminal 121 can communicate with, for example, the base station 6 and proceeds the processing to a step ST8 for transmitting information by using the internal communication terminal 70 and the mobile terminal 121. If there is a possibility that the internal communication terminal 70 cannot communicate with the mobile terminal 121, the occupant protection ECU 30 proceeds the processing to a step ST9.

At the step ST8, the internal communication ECU 28 of the internal communication terminal 70 of the automobile 10 transmits the rich emergency information that is collected before and after the emergency situation arises to the mobile terminal 121 by using the internal communication device 71. The rich emergency information is immediately transmitted from the internal communication terminal 70 to the server apparatus for the request for the emergency dispatch via the mobile terminal 121 and the base station 6 that can communicate at the time. The automobile 10 can immediately transmit the rich emergency information to the server apparatus 2, based on the detection of the accident of the automobile 10.

The internal communication ECU 28 does not transmit all of the rich emergency information at one time. For example, the information in the accident for notification that the emergency situation arises may be first transmitted, and the information for determining the other status of the accident such as information before the accident occurs or image data may be subsequently transmitted.

The step ST9 is performed in the case where there is a possibility that the external communication terminal 60 and the internal communication terminal 70 cannot immediately transmit the rich emergency information. In this case, the occupant protection ECU 30 of the automobile 10 transmits, as the emergency notification, part of the collected rich emergency information such as the information in the accident for notification that the emergency situation arises to the server apparatus 2 by using the external communication terminal 60. The information in the accident for notification that the emergency situation arises is immediately transmitted from the external communication terminal 60 to the server apparatus 2 for the request for the emergency dispatch via the base station 6 that can communicate at the time. The occupant protection ECU 30 of the automobile 10 can immediately transmit at least the information in the accident for notification that the emergency situation arises to the server apparatus 2, based on the detection of the accident of the automobile 10.

Figure 6:
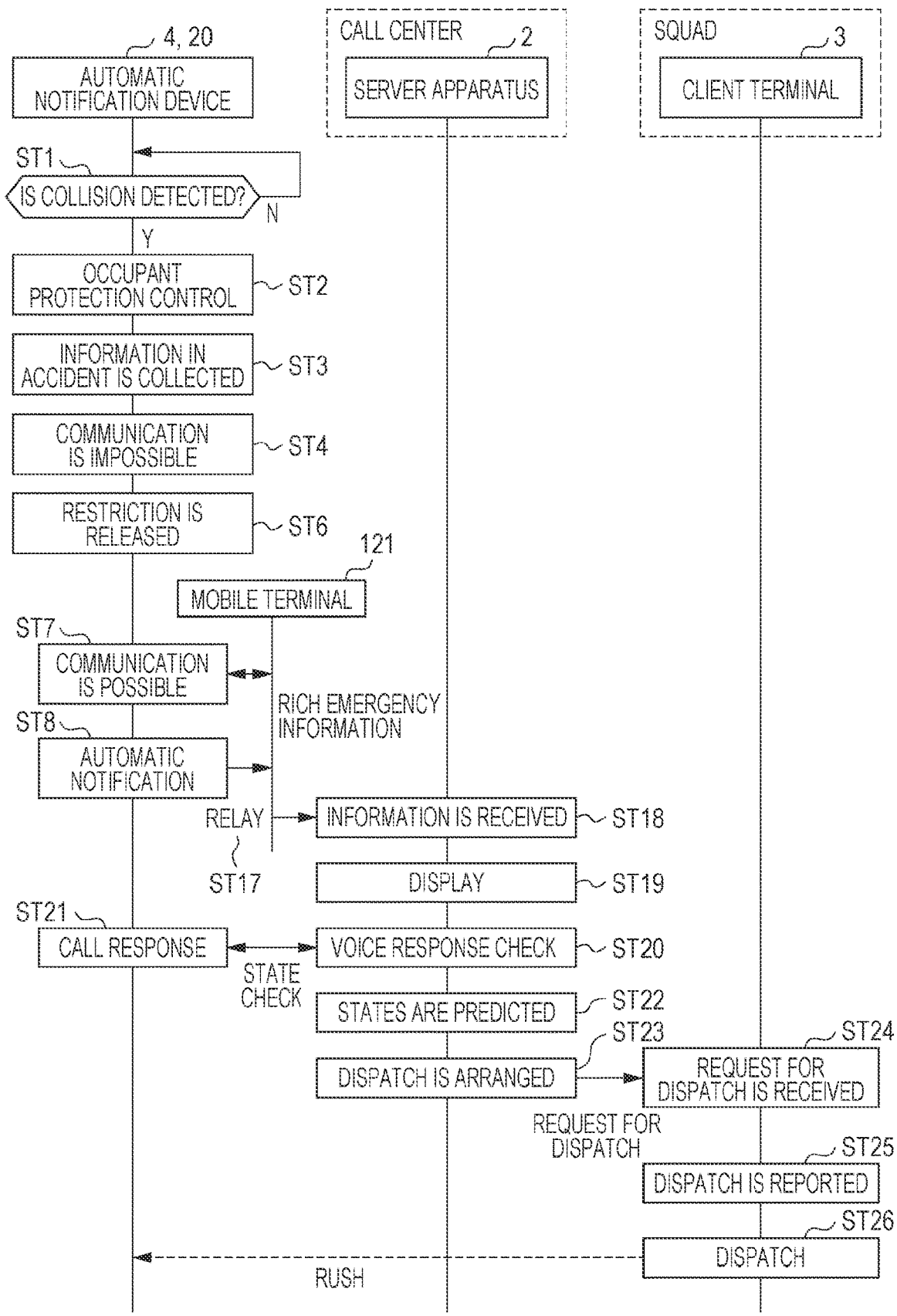
FIG. 6 is a sequence chart illustrating an example of the automatic notification process in the entire automatic emergency notification system in FIG. 1.

FIG. 6 is a sequence chart illustrating an example of the automatic notification process in the entire automatic emergency notification system 1 in FIG. 1.

FIG. 6 illustrates an example in which there is a possibility that the external communication terminal 60 cannot immediately transmit the rich emergency information, and the internal communication terminal 70 can establish communication with the mobile terminal 121 for immediately transmitting the rich emergency information.

In FIG. 6, the control system 20 of the automatic notification device 4 of the automobile 10, the server apparatus 2 in the call center, and the client terminal 3 of the squad are illustrated. Time elapses in the direction from above to below.

At a step ST1, the detection ECU 26 of the automobile 10 detects a collision of the automobile 10.

At a step ST2, the detection ECU 26 of the automobile 10 that detects the collision outputs the information about the result of the collision detection to the automobile network 36. The occupant protection ECU 30 actuates one or more devices among the seat belt devices 81 and 82 and the airbag devices 83 to 86, based on the information about the result of the collision detection that is outputted from the detection ECU 26 to the automobile network 36 and performs the occupant protection control.

At a step ST3, the occupant protection ECU 30 of the automobile 10 that implements the occupant protection control collects the rich emergency information including the information in the accident for notification that the emergency situation arises.

At a step ST4, the occupant protection ECU 30 of the automobile 10 determines whether the external communication terminal 60 that is disposed in the automobile 10 can immediately transmit the rich emergency information to the base station 6 and determines that immediate transmission is impossible.

At a step ST6, the occupant protection ECU 30 of the automobile 10 releases the communication restriction on the internal communication terminal 70 that is differently disposed in the automobile 10. This enables the internal communication terminal 70 to communicate with, for example, the mobile terminal 121 that is not registered and that is located on the outside of the automobile.

At a step ST7, the occupant protection ECU 30 of the automobile 10 determines that the internal communication terminal 70 can communicate with the mobile terminal 121 that serves as the external device.

At a step ST8, the occupant protection ECU 30 of the automobile 10 transmits the collected rich emergency information from the internal communication terminal 70 to the mobile terminal 121.

At a step ST17, the mobile terminal 121 relays and transmits the rich emergency information that is received from the internal communication terminal 70 to the server apparatus 2. This enables the emergency information about the automobile 10 that has the accident to be immediately transmitted to the server apparatus 2.

At a step ST18, the server communication device 91 of the server apparatus 2 in the call center receives automatic notification information from the automobile 10 that has the accident. The automatic notification information that is received by the server communication device 91 may be stored in the server memory 92.

At a step ST19, the server CPU 93 of the server apparatus 2 in the call center causes the server monitor 95 to display the emergency information that the server communication device 91 receives by the automatic notification. The operator in the call center can check the state of the accident of the automobile 10, based on the emergency information that is displayed on the server monitor 95.

At a step ST20, the server CPU 93 of the server apparatus 2 in the call center communicates with the external communication ECU 27 of the automobile 10 that has the accident. At a step ST21, the occupant protection ECU 30 of the automobile 10 responds to a voice call. Consequently, a call line through which a call can be made is established between the server call device 96 and, for example, the microphone 55 of the automobile 10. The operator in the call center can check the safety and health of each occupant by using a voice. This enables states such as the degree of injury of the occupant in the automobile 10 that has the accident to be directly checked. The operator in the call center may input the result of checking into the server apparatus 2. For example, in the case where the external communication terminal 60 malfunctions, the call line through which the call can be made is not established. Even in this case, the operator in the call center can check the displayed emergency information and the safety and health of each occupant in consideration for the fact that there is a possibility that the call line cannot be established.

At a step ST22, the server CPU 93 of the server apparatus 2 in the call center predicts the states. The server CPU 93 may predict the states, based on the automatic notification information that is received by the server communication device 91 and information that is inputted by the operator in the call center. The server CPU 93 may collate information about past accidents and may predict the states by performing an artificial intelligence process. The operator in the call center may comprehensively consider and predict the states and may input the result of prediction into the server apparatus 2.

At a step ST23, the server CPU 93 of the server apparatus 2 in the call center arranges dispatch depending on the status of the emergency situation. The server CPU 93 transmits the request for dispatch to the client terminal 3 of the squad by using the server communication device 91. The server CPU 93 may transmit the request for dispatch, based on the operation of the operator in the call center.

At a step ST24, the client communication device 101 of the client terminal 3 of the squad receives the request for dispatch from the server apparatus 2. The request for dispatch that is received by the client communication device 101 may be stored in the client memory 102.

At a step ST25, the client CPU 103 of the client terminal of the squad reports the dispatch. The client CPU 103 outputs a sound for the request for dispatch from the client notification device 104, based on the fact that the client communication device 101 receives the request for dispatch. The client CPU 103 may cause the client monitor 106 to display a screen for the request for dispatch. The automatic notification information and the information that is inputted by the operator in the call center may be displayed on the screen for the request for dispatch.

At a step ST26, the members of the squad are dispatched. The sound for the request for dispatch and the screen for the request for dispatch enable the members of the squad to grasp the presence of the request for dispatch to the squad and enable the emergency dispatch by using the medical helicopter or the ambulance 11.

Consequently, the medical helicopter or the first aid squad can be dispatched in the minimum lead time without delay, based on the emergency information that is automatically transmitted from the automobile 10 that has the accident. Appropriate preparation and organization based on the emergency information that is acquired in advance enable the emergency dispatch of the medical helicopter or the first aid squad to the site. There is an increased possibility that a person who is under the emergency situation such as an accident is saved.

According to the present embodiment, the automobile 10 automatically transmits the emergency information about the automobile 10 about the emergency situation to the server apparatus 2 of the automatic emergency notification system 1 via the external communication terminal 60 and the base station 6 in the case where the automobile 10 is under the emergency situation, as described above. This enables the server apparatus 2 to immediately grasp the emergency situation of the automobile 10. In one example according to the present embodiment, the image data that is acquired by imaging the interior or exterior of the automobile 10, for example, is collected and transmitted after the emergency situation arises in addition to the information in the accident for notification that the emergency situation arises. The server apparatus 2 can grasp the emergency situation of the automobile 10 in detail in a manner in which the rich emergency information including the information in the accident that is collected before and after the emergency situation arises is thus transmitted where the rich emergency information has an amount larger than that of the information in the accident for notification that the emergency situation arises. Other than this, the rich information that can be used by the server apparatus 2 may include at least one of, for example, information about the occupant-on-board state of the automobile 10, information about the state of the automobile 10, information about the latest location or time at which the automobile travels, information about the kind, color, or characteristics of the automobile 10, or a latest imaged image. This enables the server apparatus 2 to determine, by using the rich information such as information about the on-board state that is acquired in the automobile 10, the states in the emergency, which are difficult to determine accurately by using the emergency information about the emergency situation of the automobile 10 alone.

Moreover, according to the present embodiment, the internal communication terminal 70 that differs from the external communication terminal 60 is disposed in the automobile 10 for communication with the external device that differs from the base station 6 such as the mobile terminal 121 of the occupant or the mobile terminal 121 of a pedestrian who is near the site of the accident. The internal communication terminal 70 restrictedly communicates with the external device such as the mobile terminal 121. When the emergency situation such as an accident arises, the control unit determines whether the external communication terminal 60 can immediately transmit the rich emergency information to the server apparatus 2 via the base station 6 that can communicate at the time. If there is a possibility that the rich emergency information cannot be immediately transmitted, the control unit releases the communication restriction on the internal communication terminal 70 to transmit the rich emergency information including the emergency notification to the server apparatus 2 by using the internal communication terminal 70 and the mobile terminal 121. Consequently, the control unit enables the rich emergency information including the emergency notification to be transmitted to the external device by using the internal communication terminal 70 and enables the rich emergency information to be transmitted to the server apparatus 2 even in the case where there is a possibility that the external communication terminal 60 cannot transmit the emergency information due to the emergency situation such as an accident or in the case where there is a possibility that the external communication terminal 60 cannot transmit the rich emergency information to the base station 6 at the position at which the automobile 10 is in the emergency state. The server apparatus 2 can receive the rich emergency information as immediately as possible regardless of the state of the automobile 10 that is under the emergency situation.

In the case where the state of communication is thus not sufficient for transmitting the information in the emergency, the automobile 10 that is in the emergency state can immediately transmit the emergency notification to the server apparatus 2 even by using an alternative method to the communication method of the automobile. The automobile 10 that is in the emergency state can increase a possibility that data is received by the server apparatus 2 via a different communication channel by using the internal communication terminal 70 even when there is a possibility that the external communication terminal 60 cannot immediately transmit the emergency information to the server apparatus 2 when the emergency situation arises.

The automobile 10 can thus try to immediately transmit the rich information that has a possibility of not being transmitted as the information in the accident for notification that the emergency situation arises to the server apparatus 2 regardless of the state of the emergency.

According to the present embodiment, releasing the communication restriction on the internal communication terminal 70 is limited to the case where there is a possibility that the external communication terminal 60 cannot immediately transmit the rich emergency information. For this reason, there is a possibility that the internal communication terminal 70 cannot communicate with the mobile terminal 121 that is not registered with a timing except for the timing described above. The security of the internal communication terminal 70 and the control system 20 of the automobile 10 that uses the internal communication terminal 70 is not unnecessarily reduced.

The embodiment described above is an example of preferred embodiments of the disclosure. However, the embodiment of the disclosure is not limited thereto, and various modifications or alterations can be made without departing from the spirit of the embodiment of the disclosure.

According to the embodiment described above, there are the divided ECUs in each automobile 10. However, some or all of these may be integrated into a single ECU.

According to the embodiment of the disclosure, the vehicle automatically transmits the emergency information about the emergency situation to the server apparatus of the automatic emergency notification system for the vehicle via the first communication device and the base station in the case where the vehicle is under the emergency situation. This enables the server apparatus to immediately grasp the emergency situation of the vehicle.

Moreover, according to the embodiment of the disclosure, the second communication device that differs from the first communication device is disposed in the vehicle for communication with the external device that differs from the base station such as the mobile terminal of a pedestrian who is near the site of the accident or the mobile terminal that is owned by an occupant. During normal travelling, the second communication device restrictedly communicates with the external device that is registered as an authenticated terminal in advance such as the mobile terminal of the occupant. When the emergency situation arises, the control unit determines whether the first communication device can immediately transmit the emergency information to the server apparatus. If there is a possibility that the emergency information cannot be immediately transmitted, the control unit releases the communication restriction on the second communication device to transmit the emergency information to the server apparatus by using the second communication device and the external device. Consequently, the control unit enables the emergency information to be transmitted to the external device by using the second communication device and enables the emergency information to be transmitted to the server apparatus even in the case where there is a possibility that the first communication device cannot transmit the emergency information due to the emergency situation such as an accident or in the case where there is a possibility that the first communication device cannot transmit the emergency information to the base station at the position at which the vehicle is in the emergency state. The server apparatus can receive the emergency information as immediately as possible regardless of the state of the vehicle that is under the emergency situation.

In the case where the state of communication is thus not sufficient for transmitting the information in the emergency, the vehicle that is in the emergency state can immediately transmit the rich information that has a possibility of not being transmitted as the information in the accident to the server apparatus even by using an alternative method to the communication method of the vehicle. The vehicle that is in the emergency state can increase a possibility that data is received by the server apparatus via a different communication channel using the second communication device even when there is a possibility that the first communication device cannot immediately transmit the emergency information to the server apparatus when the emergency situation arises.

The ECUs illustrated in FIG. 4 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the ECUs including the drive ECU 21, the steering ECU 22, the brake ECU 23, the travel ECU 24, the driving operation ECU 25, the detection ECU 26, the external communication ECU 27, the internal communication ECU 28, the UI operation ECU 29, and the occupant protection ECU 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 4.

The invention claimed is:

1. A vehicle that has an automatic notification function, the vehicle comprising: a first communication device disposed in the vehicle for communication with a base station, the first communication device being configured to transmit emergency information to a server apparatus of an automatic emergency notification system for the vehicle via the base station in a case where an emergency situation arises; a control unit configured to automatically transmit the emergency information to the server apparatus by using the first communication device in the case where the emergency situation arises; and a second communication device that differs from the first communication device and that is disposed in the vehicle for communication with an external device that differs from the base station, the second communication device being configured to restrictedly communicate with the external device, wherein the control unit is configured to determine whether the first communication device is capable of immediately transmitting the emergency information to the server apparatus in the case where the emergency situation arises, based on determining that the first communication device is capable of immediately transmitting the emergency information, immediately transmit the emergency information to the server apparatus by using the first communication device, and based on determining that the first communication device is not capable of immediately transmitting the emergency information, release communication restriction on the second communication device to transmit the emergency information to the server apparatus by using the second communication device and the external device.

2. The vehicle according to claim 1,
wherein the control unit is configured to
collect information after the emergency situation arises, determine whether the first communication device is capable of immediately transmitting, as the emergency information, rich information that is collected before and/or after the emergency situation arises and that includes the information, and based on determining that the first communication device is capable of immediately transmitting the rich information, immediately transmit the rich information to the server apparatus by using the first communication device, and based on determining that the first communication device is not capable of immediately transmitting the rich information, release the communication restriction on the second communication device to transmit the rich information to the server apparatus by using the second communication device and the external device.

3. The vehicle according to claim 1,
wherein the control unit is configured to
collect, as the rich information, image data that is acquired by imaging an interior of the vehicle after the emergency situation arises.

4. The vehicle according to claim 2,
wherein the control unit is configured to
collect, as the rich information, image data that is acquired by imaging an interior of the vehicle after the emergency situation arises.

5. The vehicle according to claim 1,
wherein the control unit is configured to
determine whether the first communication device is capable of immediately transmitting the rich information, based on at least one of information about communication capability of a communication channel that is established between the first communication device and the base station or information about communication performance of the base station with which the first communication device is capable of communicating.

6. The vehicle according to claim 2,
wherein the control unit is configured to
determine whether the first communication device is capable of immediately transmitting the rich information, based on at least one of information about communication capability of a communication channel that is established between the first communication device and the base station or information about communication performance of the base station with which the first communication device is capable of communicating.

7. The vehicle according to claim 3,
wherein the control unit is configured to
determine whether the first communication device is capable of immediately transmitting the rich information, based on at least one of information about communication capability of a communication channel that is established between the first communication device and the base station or information about communication performance of the base station with which the first communication device is capable of communicating.

8. The vehicle according to claim 4,
wherein the control unit is configured to
determine whether the first communication device is capable of immediately transmitting the rich information, based on at least one of information about communication capability of a communication channel that is established between the first communication device and the base station or information about communication performance of the base station with which the first communication device is capable of communicating.

9. The vehicle according to claim 1,
wherein the second communication device is disposed in the vehicle for communication with a communication terminal that is configured to serve as the external device in an interior of the vehicle and is configured to communicate with the external device by communication with the external device, the second communication device being imposed at least one of a first communication restriction and a second communication restriction,
wherein the first communication restriction permits a communication with the external device which is authenticated in the second communication device, and prohibits a communication with the external device which is unauthenticated in the second communication device,
wherein the second communication restriction permits a communication within the vehicle, and prohibits a communication outside the vehicle,
wherein the control unit is configured to
based on determining that the first communication device is not capable of immediately transmitting the rich information, release at least one of the first communication restriction and the second communication restriction on the second communication device, and transmit the emergency information to the server apparatus via the external device which is unauthenticated in the second communication device.

10. The vehicle according to claim 2,
wherein the second communication device is disposed in the vehicle for communication with a communication terminal that is configured to serve as the external device in an interior of the vehicle and is configured to communicate with the external device by communication with the external device, the second communication device being imposed at least one of a first communication restriction and a second communication restriction,
wherein the first communication restriction permits a communication with the external device which is authenticated in the second communication device, and prohibits a communication with the external device which is unauthenticated in the second communication device,
wherein the second communication restriction permits a communication within the vehicle, and prohibits a communication outside the vehicle,
wherein the control unit is configured to
based on determining that the first communication device is not capable of immediately transmitting the rich information, release at least one of the first communication restriction and the second communication restriction on the second communication device, and transmit the emergency information to the server apparatus via the external device which is unauthenticated in the second communication device.

11. The vehicle according to claim 3,
wherein the second communication device is disposed in the vehicle for communication with a communication terminal that is configured to serve as the external device in an interior of the vehicle and is configured to communicate with the external device by communication with the external device, the second communication device being imposed at least one of a first communication restriction and a second communication restriction,
wherein the first communication restriction permits a communication with the external device which is authenticated in the second communication device, and prohibits a communication with the external device which is unauthenticated in the second communication device,
wherein the second communication restriction permits a communication within the vehicle, and prohibits a communication outside the vehicle,
wherein the control unit is configured to
based on determining that the first communication device is not capable of immediately transmitting the rich information, release at least one of the first communication restriction and the second communication restriction on the second communication device, and transmit the emergency information to the server apparatus via the external device which is unauthenticated in the second communication device.

12. The vehicle according to claim 4,
wherein the second communication device is disposed in the vehicle for communication with a communication terminal that is configured to serve as the external device in an interior of the vehicle and is configured to communicate with the external device by communication with the external device, the second communication device being imposed at least one of a first communication restriction and a second communication restriction,
wherein the first communication restriction permits a communication with the external device which is authenticated in the second communication device, and prohibits a communication with the external device which is unauthenticated in the second communication device,
wherein the second communication restriction permits a communication within the vehicle, and prohibits a communication outside the vehicle,
wherein the control unit is configured to
based on determining that the first communication device is not capable of immediately transmitting the rich information, release at least one of the first communication restriction and the second communication restriction on the second communication device, and transmit the emergency information to the server apparatus via the external device which is unauthenticated in the second communication device.

13. The vehicle according to claim 5,
wherein the second communication device is disposed in the vehicle for communication with a communication terminal that is configured to serve as the external device in an interior of the vehicle and is configured to communicate with the external device by communication with the external device, the second communication device being imposed at least one of a first communication restriction and a second communication restriction,
wherein the first communication restriction permits a communication with the external device which is authenticated in the second communication device, and prohibits a communication with the external device which is unauthenticated in the second communication device,
wherein the second communication restriction permits a communication within the vehicle, and prohibits a communication outside the vehicle,
wherein the control unit is configured to
based on determining that the first communication device is not capable of immediately transmitting the rich information, release at least one of the first communication restriction and the second communication restriction on the second communication device, and transmit the emergency information to the server apparatus via the external device which is unauthenticated in the second communication device.

14. The vehicle according to claim 6,
wherein the second communication device is disposed in the vehicle for communication with a communication terminal that is configured to serve as the external device in an interior of the vehicle and is configured to communicate with the external device by communication with the external device, the second communication device being imposed at least one of a first communication restriction and a second communication restriction,
wherein the first communication restriction permits a communication with the external device which is authenticated in the second communication device, and prohibits a communication with the external device which is unauthenticated in the second communication device,
wherein the second communication restriction permits a communication within the vehicle, and prohibits a communication outside the vehicle,
wherein the control unit is configured to
based on determining that the first communication device is not capable of immediately transmitting the rich information, release at least one of the first communication restriction and the second communication restriction on the second communication device, and transmit the emergency information to the server apparatus via the external device which is unauthenticated in the second communication device.

15. The vehicle according to claim 7,
wherein the second communication device is disposed in the vehicle for communication with a communication terminal that is configured to serve as the external device in an interior of the vehicle and is configured to communicate with the external device by communication with the external device, the second communication device being imposed at least one of a first communication restriction and a second communication restriction,
wherein the first communication restriction permits a communication with the external device which is authenticated in the second communication device, and prohibits a communication with the external device which is unauthenticated in the second communication device,
wherein the second communication restriction permits a communication within the vehicle, and prohibits a communication outside the vehicle,
wherein the control unit is configured to
based on determining that the first communication device is not capable of immediately transmitting the rich information, release at least one of the first communication restriction and the second communication restriction on the second communication device, and transmit the emergency information to the server apparatus via the external device which is unauthenticated in the second communication device.

16. The vehicle according to claim 8,
wherein the second communication device is disposed in the vehicle for communication with a communication terminal that is configured to serve as the external device in an interior of the vehicle and is configured to communicate with the external device by communication with the external device, the second communication device being imposed at least one of a first communication restriction and a second communication restriction,
wherein the first communication restriction permits a communication with the external device which is authenticated in the second communication device, and prohibits a communication with the external device which is unauthenticated in the second communication device,
wherein the second communication restriction permits a communication within the vehicle, and prohibits a communication outside the vehicle,
wherein the control unit is configured to
based on determining that the first communication device is not capable of immediately transmitting the rich information, release at least one of the first communication restriction and the second communication restriction on the second communication device, and transmit the emergency information to the server apparatus via the external device which is unauthenticated in the second communication device.

17. A vehicle that has an automatic notification function, the vehicle comprising: a first communication device that is disposed in the vehicle for communication with a base station, the first communication device being configured to transmit emergency information to a server apparatus of an automatic emergency notification system for the vehicle via the base station in a case where an emergency situation arises; a second communication device that differs from the first communication device and that is disposed in the vehicle for communication with an external device that differs from the base station, the second communication device being configured to restrictedly communicate with the external device; and circuitry configured to automatically transmit the emergency information to the server apparatus by using the first communication device in the case where the emergency situation arises, determine whether the first communication device is capable of immediately transmitting the emergency information to the server apparatus in the case where the emergency situation arises,
based on determining that the first communication device is capable of immediately transmitting the emergency information, immediately transmit the emergency information to the server apparatus by using the first communication device, and
based on determining that the first communication device is not capable of immediately transmitting the emergency information, release communication restriction on the second communication device to transmit the emergency information to the server apparatus by using the second communication device and the external device.

\* \* \* \* \*